Patented Mar. 11, 1941

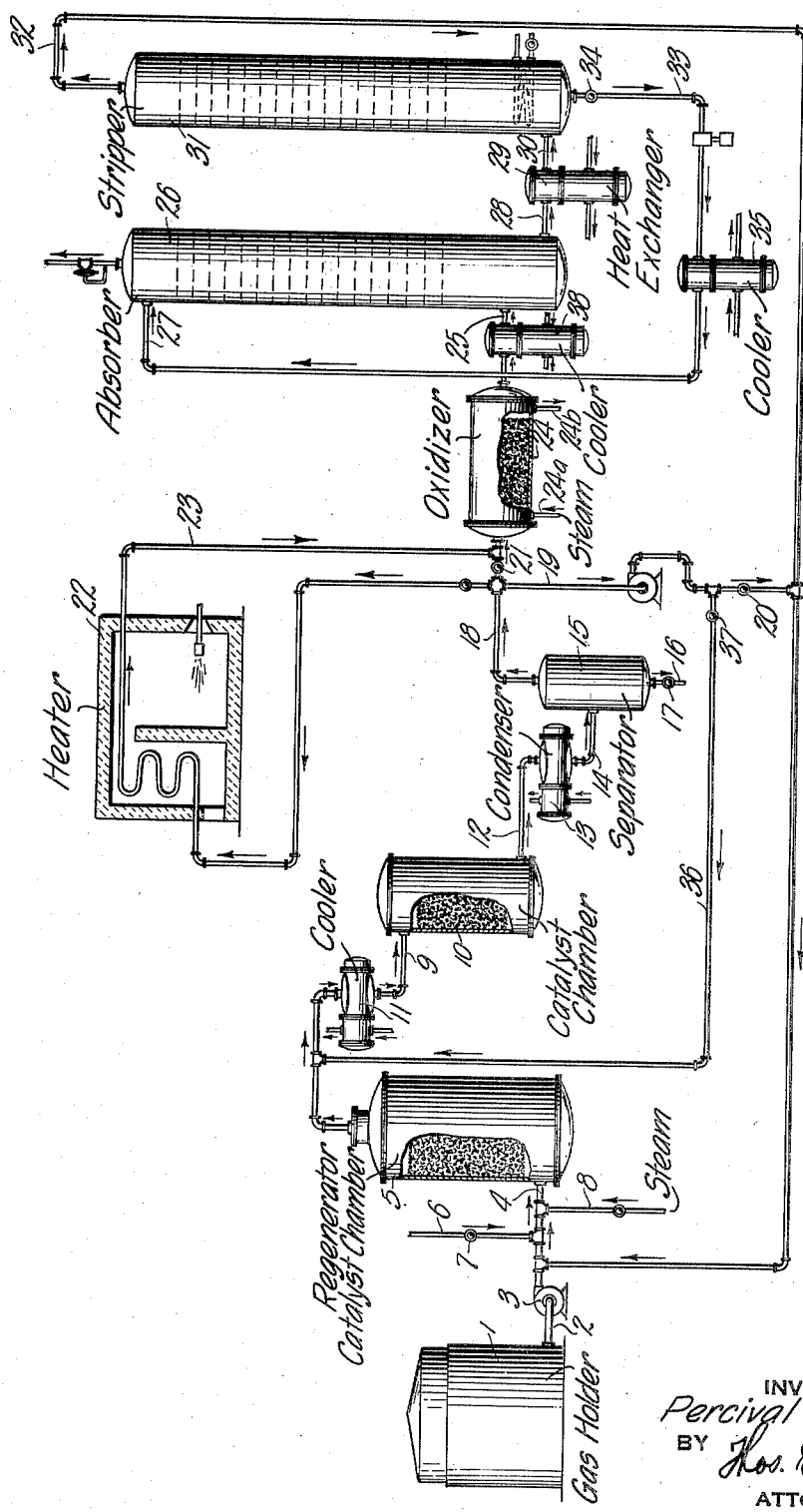

2,234,941

UNITED STATES PATENT OFFICE 2,234,941

METHOD OF SYNTHESIZING HYDROCARBONS

Percival C. Keith, Jr., Peapack, N. J.

Application May 18, 1938, Serial No. 208,588

7 Claims. (Cl. 260—449)

My invention relates to a method of synthesizing liquid hydrocarbons and more particularly to a method of converting methane and light hydrocarbon gases into hydrocarbon suitable for motor fuel and other heavier fractions, such as lubricating oil, Diesel oil, and the like.

There is, at the present time, a large quantity of waste gas, principally methane, in the producing fields and in the oil refineries of the United States. A large portion of the waste occurs at the wells during production of crude oil. A considerable amount of methane is burned for fuel, where it could be more economically used otherwise, as in the process hereinafter explained.

It has been proposed to produce synthesis gas mixture of carbon monoxide and hydrogen from solid fuels and from hydrocarbon gases, particularly natural gas, which is predominantly methane. In the production of synthesis gas from either gaseous or solid raw materials it has been found highly uneconomical to produce a synthesis gas which contains no diluent nitrogen. In the gasification of solid fuels it is very difficult to produce mixtures of carbon monoxide and hydrogen which do not contain substantial amounts of nitrogen. In this country we propose to use natural gas as the raw material. Natural gas from many producing areas contains appreciable percentages of nitrogen.

Methane is stable chemically, and to overcome its inertness or stability, considerable energy must be expended. One object of my invention is to provide a method of synthesizing liquid hydrocarbons from gaseous hydrocarbons, such as methane, which has been converted into carbon monoxide and hydrogen in proportions that may be synthesized in the presence of a catalyst at proper temperature and pressure conditions. While methane is preferred as a charging stock, it will be understood that any light hydrocarbon gas having three, or fewer carbon atoms per molecule is suitable for the process.

Fischer and Tropsch, and others, have synthesized hydrocarbons from mixtures of carbon monoxide and hydrogen. In their processes ordinary solid fuels such as coke, semi-coke, and coal are subjected to the water gas reaction to produce a mixture of carbon monoxide and hydrogen. The water gas thus formed is treated to remove hydrogen sulphide and organically combined sulphur to avoid sulphur poisoning of the catalyst. The carbon monoxide and hydrogen are then reacted at substantially atmospheric pressure and temperatures in the vicinity of 200° C. (390° F.) to form liquid hydrocarbons and water.

The catalysts used in the above process may be of many types. Satisfactory results are obtained with mixtures of cobalt-thorium-kieselguhr, nickel-manganese-alumina-kieselguhr, or cobalt-thorium-copper-kieselguhr, prepared by reduction of metallic nitrates with hydrogen. Innumerable combinations of metals precipitated on inert carriers or alloy catalysts have given satisfaction.

If the mixture of carbon monoxide and hydrogen subjected to the synthesis is poor in hydrogen, it is necessary to work at somewhat higher temperatures, and a larger proportion of olefins will be produced. If the mixture of carbon monoxide and hydrogen is rich in hydrogen, it is necessary to work at lower temperatures in order to avoid the production of methane according to the Sabatier methane synthesis.

According to the theoretical reaction in the Fischer and Tropsch synthesis, two volumes of hydrogen should be present to one volume of carbon monoxide. Under certain conditions, however, it is advantageous to operate the synthesis with carbon monoxide-hydrogen ratios somewhat different from those required according to theoretical dictation, and for this reason the ratio of carbon monoxide to hydrogen may be of the order of one to one.

When it is found desirable to operate with a synthesis gas having a carbon monoxide to hydrogen ratio of 1 to 2 it is possible to use successive catalytic synthesis stages and to convert a major portion of the carbon monoxide and hydrogen, even though a considerable amount of diluent nitrogen is present. I have found, however, that it is often desirable because of better product quality to operate the synthesis with a gas that is richer in carbon monoxide than the 1 to 2 ratio in which carbon monoxide and hydrogen are consumed. In this case the unconverted gases leaving the synthesis will be very rich in carbon monoxide so that it is necessary to recycle the tail gas to avoid the losses of the carbon. If inert gases, such as nitrogen, are present in the gas charged to the synthesis it is necessary to remove them so that they will not build up in the recycle operation.

There are three sources of oxygen that are readily available for partial oxidation of methane to produce mixtures of carbon monoxide and hydrogen. These are—oxygen, steam and carbon dioxide. Oxygen may be obtained by using air without purification, or it may be separated from nitrogen in a low temperature or rectification plant. The theoretical equations for partial oxidation of methane with these three materials are as follows:

1. $CH_4 + 1/2(O_2) \rightarrow CO + 2H_2$
2. $CH_4 + H_2O \rightarrow CO + 3H_2$
3. $CH_4 + CO_2 \rightarrow 2CO + 2H_2$ It will be noted that when air is used the ratio of carbon monoxide to hydrogen is 1 to 2, the theoretical ratio in which the gases are consumed in synthesis. When steam is used the ratio is 1 to 3. When carbon dioxide is used the ratio is 1 to 1. As pointed out previously, this last ratio has been found highly desirable in the synthesis when an unsaturated product of high octane number is desired. Cobalt is preferred to nickel as a catalyst for the production of unsaturates.

I propose to use carbon dioxide as the oxidizing medium, as indicated in equation three above.

In general, my invention contemplates the oxidation of methane with carbon dioxide prior to the synthesis to form a carbon monoxide mixture with hydrogen having a ratio substantially of one to one, and the subsequent synthesis of this gas to produce liquid hydrocarbons in the presence of a catalyst. Immediately following the synthesis the liquids are separated and the gases, containing principally unreacted carbon monoxide and hydrogen, are oxidized to convert the carbon monoxide to carbon dioxide and the nitrogen is extracted by a selective method in a separate stage. The carbon dioxide is recycled to the initial stage, where it is combined with the methane to produce the synthesis gas mixture.

The carbon monoxide in the tail gas is oxidized to carbon dioxide, separated from the inert nitrogen, and returned to the synthesis gas manufacturing step to be used as the oxidizing gas. This method of separating carbon monoxide and nitrogen is highly desirable since these two gases are separated directly only with difficulty. By converting carbon monoxide to carbon dioxide the gases may be separated by a number of well known and simple methods.

The overall effect of this process is to use the reversible reaction—$CO + (O) \leftrightarrow CO_2$—to provide oxygen for the partial oxidation of a hydrocarbon gas.

In certain cases it is found desirable to recycle tail gases from the synthesis step directly to the synthesis. This method of operation is covered in my copending application Serial No. 157,341, filed August 4, 1937. As an improvement over the operation described in this application, a portion of the recycle gases is withdrawn, the carbon monoxide oxidized to carbon dioxide, the nitrogen eliminated, and the carbon dioxide returned to the synthesis gas manufacturing step. By this method of operation any inert nitrogen is allowed to build up in the recycle stream and a portion of the stream is withdrawn and freed of nitrogen. The advantage of this operation lies in the reduced size of the conversion equipment, since only a portion of the tail gas is treated.

The accompanying drawing, which forms a part of the instant specification and which is to be read in conjunction therewith, is a diagrammatic view of one form of apparatus capable of carrying out the process and invention. More particularly, referring now to the drawing, methane from any suitable source, such as a holder 1, passes through line 2 and is forced by pump 3 through line 4 to a regenerator 5 containing catalyst positioned in beds therein, or checkerwork brick built of catalytic brick-work built up in the interior of the container. Prior to charging the gas to the system it is preferably desulphurized by any suitable method well known to the art. A conventional method is that offered by the Girdler Corporation in which the gas is contacted with triethanolamine. Other processes of a similar character use sodium phenolate and diaminoisopropanol. If desired, sodium hydroxide may be used or combinations of the above method with sodium hydroxide may be employed to reduce the sulphur content of the methane to about one-tenth of one grain per 100 cubic feet. The removal of sulphur is desirable in order to avoid poisoning of the catalyst.

Carbon dioxide is added to the methane charge through pipe 6 controlled by valve 7. In the regenerator 5 the methane-carbon dioxide mixture is raised to a temperature sufficiently high to convert the mixture to carbon monoxide and hydrogen substantially in the ratio of one to one. The following reaction takes place in the regenerator: $CH_4 + CO_2 + X$ cal. $\rightarrow 2CO + 2H_2$. This reaction will take place within the vicinity of 2000° F. in the presence of a catalyst comprising nickel deposited on clay of high alumina content, such as fire clay or alundum.

The ratio of carbon monoxide to hydrogen may be varied by the addition of steam through line 8.

On being discharged from the regenerator 5, the carbon monoxide mixture is directed through line 9 to a synthesis chamber 10 wherein is maintained a catalyst of the character previously mentioned. Temperatures in the synthesis chamber are maintained somewhat above 200° C. (392° F.) to obtain proper reaction owing to the fact that the mixture is low in hydrogen. In order to obtain and control the temperatures in the synthesis chamber, a cooler 11 is positioned in the line 9. This cooler is supplied with a cooling medium, either from products of the system or from an outside source. The recirculated carbon dioxide hereinafter described would serve as a proper medium to assist in reduction of the temperature of this synthesis gas mixture. The synthesis chamber 10 is preferably of the type shown in a co-pending application, Serial 122,340, filed January 26, 1937, in which I am a joint inventor, and wherein there is disclosed a method of forming synthesis gas from methane and other light hydrocarbons. After reaction, the products are discharged from the chamber through pipe 12, thence to condenser 13, through line 14 to a separator 15. The separator is equipped with a liquid drawoff line 16 controlled by valve 17 and an overhead line 18 for removing the unreacted gases.

The unreacted gases are principally carbon monoxide and nitrogen, the latter being inert in the system. Provision is made in the form of a pipe 19 controlled by valve 20 for recirculating desired amounts of this gas back to be reintroduced into the regenerator with the methane charge. Gas from the separator that is not recycled is directed by regulation of valve 21 in line 18 to a heater 22 where it is raised to a temperature of the order of 1000° to 1500° F. After heating, the gas is passed through line 23 to an oxidizer 24 where carbon monoxide in the gas is converted to carbon dioxide. The oxidizing stage 70 comprises a tank or container partially filled with a porous bed of ferrite or iron oxide, diagrammatically shown.

This oxidizing stage may be included in the system in the form of alternate chambers so that one can be isolated from the system to be regenerated while the other is used. To regenerate the iron oxide, steam is introduced through line 24a under proper temperature and pressure conditions and exhausted through pipe 24b. The conversion of the iron oxide to metallic iron or lower oxide takes place in changing carbon monoxide to carbon dioxide, and regeneration with steam converts the metallic iron or lower oxide back to its oxide state, which may be a higher oxide, with accompanying production of hydrogen.

After passing through the oxidizing chamber, the carbon dioxide and nitrogen mixture from the converter 24 is passed through cooler 38 and introduced through pipe 25 into tower 26. In this tower the gas is passed counterflow with a liquid absorber material selective to and adapted to remove the carbon dioxide from the mixture. This liquid absorber medium is introduced into the tower through pipe 27 and gravitates downwardly in an opposed direction to the rising gases, to be removed from the bottom thereof with the absorbed carbon dioxide through pipe 28. Its temperature is raised in a heater 29, after which it is charged through pipe 30 to the stripping tower 31. In the stripping tower the carbon dioxide is driven off and passes out through the overhead line 32, through which it is returned by a suitable pump to the regenerator 5. The absorber liquid is discharged from the bottom of tower 31 through pipe 33 regulated by valve 34, and after having its temperature reduced in cooler 35 it is recirculated through pipe 27 into the top of the absorber 26. The absorption and stripping cycle is one conventional to the art.

In an alternate method of operation the tail gas collected from the synthesis may be burned with air to furnish heat for the production of synthesis gas. Carbon dioxide is recovered from the flue gas by absorption and returned to the synthesis gas manufacturing step.

In a preferred embodiment of the method a major portion of the tail gas from the synthesis step is recycled through line 36 controlled by valve 37 to the synthesis step.

Where the synthesis proceeds with a low percentage of hydrogen, as in the proportion of one to one, the reaction is as follows:

$$2CO + 2H_2 \rightarrow (CH_2) + H_2O + CO$$

In this reaction the nitrogen is present as an inert or unreacted gas.

The removal of carbon dioxide in tower 26 is effected by conventional methods well known in the art, such as the use of monoethanolamine in a 15 to 30 percent water solution.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:
1. A process for converting light hydrocarbon gases to mixtures of carbon monoxide and hydrogen and synthesizing said mixtures for the production of liquid hydrocarbons comprising the steps of subjecting the light hydrocarbon gas to oxidation to form a carbon monoxide-hydrogen mixture, synthesizing the carbon monoxide-hydrogen mixture in the presence of a hydrogenation catalyst at temperatures of about 200° C., separating the liquid hydrocarbon produced from the unreacted gas containing carbon monoxide, hydrogen and hydrocarbon gases, oxidizing the carbon monoxide in the unreacted gases to carbon dioxide, extracting the carbon dioxide in an absorption step and passing the carbon dioxide to the initial oxidation stage.

2. A process for synthesizing carbon monoxide and hydrogen for the production of liquid hydrocarbon comprising the steps of oxidizing methane with carbon dioxide to produce a carbon monoxide-hydrogen mixture having substantially a one to one ratio, synthesizing the mixture of carbon monoxide and hydrogen in the presence of a hydrogenation catalyst at temperatures of about 200° C., separating liquid hydrocarbon produced from unreacted gas, said unreacted gas comprising carbon monoxide, hydrogen, light hydrocarbon gases and nitrogen, oxidizing the carbon monoxide in a portion of the unreacted gas to carbon dioxide and extracting said carbon dioxide by absorption from said gases, passing the carbon dioxide to the initial oxidizing step and recirculating another portion of the unreacted gas separated from the liquid hydrocarbon to the synthesis step.

3. A process for producing liquid hydrocarbons by synthesis of carbon monoxide and hydrogen, comprising the steps of oxidizing a mixture of methane and carbon dioxide to produce a carbon monoxide-hydrogen mixture having a ratio of substantially one to one, synthesizing the carbon monoxide mixture in the presence of a hydrogenation catalyst at temperatures of about 200° C., separating the liquid and unreacted gas resulting from the synthesis, oxidizing the carbon monoxide contained in a portion of the unreacted gas in a second oxidizing step, removing carbon dioxide, and recycling another portion of the unreacted gas to be recharged with the methane and carbon dioxide to the initial oxidizing step, said carbon dioxide being that removed from said second oxidizing step.

4. A process for producing liquid hydrocarbons by synthesis of carbon monoxide and hydrogen, comprising the steps of oxidizing a mixture of methane and carbon dioxide to produce a carbon monoxide-hydrogen mixture having a ratio of substantially one to one, synthesizing the carbon monoxide mixture in the presence of a hydrogenation catalyst at temperatures of about 200° C., separating the liquid and unreacted gas resulting from the synthesis, oxidizing the carbon monoxide contained in a portion of the unreacted gas in a second oxidizing step, removing carbon dioxide formed in said second oxidizing step, recycling a further portion of the unreacted gas to be recharged with the methane and carbon dioxide to the initial oxidizing step, and recirculating another portion of the unreacted gas removed from the synthesis to the synthesis step.

5. A process for converting light hydrocarbon gases to mixtures of carbon monoxide and hydrogen and synthesizing said mixtures for the production of liquid hydrocarbons comprising the steps of subjecting the light hydrocarbon gas to oxidation with carbon dioxide to form a carbon monoxide-hydrogen mixture, synthesizing the carbon monoxide-hydrogen mixture at an elevated temperature in the presence of a synthesis catalyst promoting the formation of liquid hydrocarbons from the mixture at such elevated temperature, separating the liquid hydrocarbons produced from the unreacted gas containing carbon monoxide, hydrogen, and hydrocarbon gases, oxidizing the carbon monoxide contained in the unreacted gases to carbon dioxide, separating the carbon dioxide thus formed from the remaining unreacted gases and passing it to the initial oxidation stage.

6. A process for converting light hydrocarbon gases to mixtures of carbon monoxide and hydrogen and synthesizing said mixtures for the production of liquid hydrocarbons comprising the steps of subjecting the light hydrocarbon gas to oxidation with carbon dioxide to form a carbon monoxide-hydrogen mixture, synthesizing the carbon monoxide-hydrogen mixture at an elevated temperature in the presence of a synthesis catalyst promoting the formation of liquid hydrocarbons from the mixture at such elevated temperature, separating the liquid hydrocarbons produced from the unreacted gas, oxidizing at least a portion of said unreacted gases to carbon dioxide and returning carbon dioxide thus formed to the initial oxidation stage.

7. A process for converting light hydrocarbon gases to mixtures of carbon monoxide and hydrogen and synthesizing said mixtures for the production of liquid hydrocarbons comprising the steps of subjecting the light hydrocarbon gas to oxidation with carbon dioxide in the presence of steam to form a carbon monoxide-hydrogen mixture, synthesizing the carbon monoxide-hydrogen mixture at an elevated temperature in the presence of a synthesis catalyst promoting the formation of liquid hydrocarbons from the mixture at such elevated temperature, separating the liquid hydrocarbons produced from the unreacted gas, oxidizing at least a portion of said unreacted gases to carbon dioxide and returning carbon dioxide thus formed to the initial oxidation stage.

PERCIVAL C. KEITH, Jr.